United States Patent [19]

Brown

[11] 4,286,200
[45] Aug. 25, 1981

Best Available Copy

[54] UNIVERSAL INTERMITTENT WINDSHIELD WIPER CIRCUIT

[75] Inventor: Ralph V. Brown, Cayuta, N.Y.

[73] Assignee: Facet Enterprises, Inc., Tulsa, Okla.

[21] Appl. No.: 47,173

[22] Filed: Jun. 8, 1979

[51] Int. Cl.³ .............................................. H02P 1/04
[52] U.S. Cl. .................................. 318/443; 318/444; 318/484
[58] Field of Search ............... 318/443, 444, 484, 446; 307/141; 15/250.12; 361/160, 191

[56] References Cited

U.S. PATENT DOCUMENTS

| 3,657,626 | 4/1972 | Rouvre et al. | 15/250.12 X |
| 3,783,362 | 1/1974 | Basso et al. | 318/443 |
| 3,927,436 | 12/1975 | Inone et al. | 318/443 X |

*Primary Examiner*—Ulysses Weldon
*Attorney, Agent, or Firm*—Remy J. VanOphem

[57] ABSTRACT

A universal intermittent windshield wiper circuit adaptable to the windshield wiper mechanism of automotive vehicles is disclosed herein. The intermittent wiper circuit comprises an R-C timer circuit periodically energizing a three pole double throw relay. The internal interconnections of the relay switch contacts permit the intermittent windshield wiper circuit to be connected to the wiper mechanism of almost all domestically manufactured automotive vehicle as well as many vehicles manufactured overseas using only external connections. The circuit is equally adaptable to external and concealed wiper mechanism.

12 Claims, 5 Drawing Figures

UNIVERSAL INTERMITTENT WINDSHIELD WIPER CIRCUIT

BACKGROUND OF THE INVENTION

1. Field of the Invention

The invention is related to electric windshield wipers for automotive vehicles and in particular to an electric circuit which causes the windshield wiper to be intermittently actuated at predetermined intervals.

2 Description of the Prior Art

Conventional windshield wiper mechanisms for automotive vehicles when activated move a wiper blade across the vehicles' windshield in a continuing back and forth motion. When deactivated, the wiper blade is returned to a "park" position which is conventionally located at one or the other extreme position of the back and forth motion or in a concealed recess below the windshield. Under certain conditions, such as a light misty rain, or after a heavier rain, where water is splashed up on the windshield from a preceding or passing vehicle, the quantity of water on the windshield is insufficient for the wiper blade to clean the windshield properly. This often results in a smearing of dirty water, and is often accompanied by an annoying squeaking sound as the blade is moved across a relatively dry window.

To avoid this problem, the prior art has developed mechanisms which when actuated cause the wiper blade to wipe the windshield with a single back and forth motion at predetermined intervals with a dwell period between wiping cycles. Preferably, the wiper blade is returned to the park position during the dwell period.

Various types of intermittent mechanisms are known. Some of these systems, such as the windshield wiper control taught by Inoue in U.S. Pat. No. 3,649,898 use a moisture detector which activates the wiper mechanism when water is detected on the windshield. Another type, such as that taught by Tann in U.S. Pat. No. 3,643,145, uses a thermistor heated by the wiper motor current to produce a variable delay inversely proportional to amount of water on the windshield. Other types of mechanisms use blocking oscillators as taught by Foreman in U.S. Pat. No. 3,219,901 or R.C. timing circuits as taught by Rouvre in U.S. Pat. No. 3,569,812.

Collectively, the patents cited above as well as the intermittent windshield wiper mechanism presently being supplied by the automobile manufactures are dedicated systems, and can only be used with particular types of wiper mechanisms. As is known, however, almost every automotive manufacture has developed its own windshield wiper mechanism. Therefore, the intermittent system developed for the wiper mechanism of one manufacture normally cannot be used with the wiper mechanism of another manufacture without extensive modification and vice versa. The owner of a vehicle, wishing to install an intermittent wiper system or have an intermittent wiper system installed is required to return to the original manufacture of the vehicle. This limits the owner's option as to where he can purchase an intermittent wiper system and the price he will have to pay for the installation.

The invention is an intermittent wiper circuit universally adaptable to the wiper mechanism of all domestic automotive manufacturers and most foreign manufacturers and which may be installed by the owner himself or any other competent mechanic such as found at a local service station.

SUMMARY OF THE INVENTION

The invention is an intermittent windshield wiper circuit which may be added to the wiper mechanism of a majority of automotive vehicles produced domestically or abroad which when activated will periodically actuate the wiper mechanism at predetermined intervals. The preferred embodiment of the circuit comprises an R.C. timing network which actuates a three pole double throw relay having two of the normally open contacts interconnected and the third normally open contact connected to a common ground. When activated, the timing circuit produces signals intermittently actuating the relay for a predetermined period of time. Activation applies electrical power to the wiper mechanism's motor for a time sufficient for the motor to move the wiper mechanism circuit from its park position. Once removed from its parked position, the wiper motor will continue to run until the wiper blade is again returned to the park position the same as if the wiper mechanism had been turned off from a continuous mode of operation using the conventional dash switch.

The intermittent wiper circuit is effectively transparent to the normal operation of the wiper mechanism, and is overriden when the normal control switch is actuated.

The object of the invention is a universal intermittent wiper circuit capable of being added to the windshield wiper mechanism of most domestic and foreign automotive vehicles.

Another object of the invention is an intermittent wiper circuit in which the wiper blade is automatically returned to the park position during the dwell period.

Another object of the invention is an intermittent wiper circuit which is transparent to the existing wiper mechanism and is overriden thereby.

A final object of the invention is an intermittent wiper circuit which may be installed by the owner or any other person having limited knowledge of electrical circuits.

These and other objects of the invention will become apparent from reading the specification in conjunction with the drawings.

DETAILED DESCRIPTION OF THE INVENTION

Figure 1:
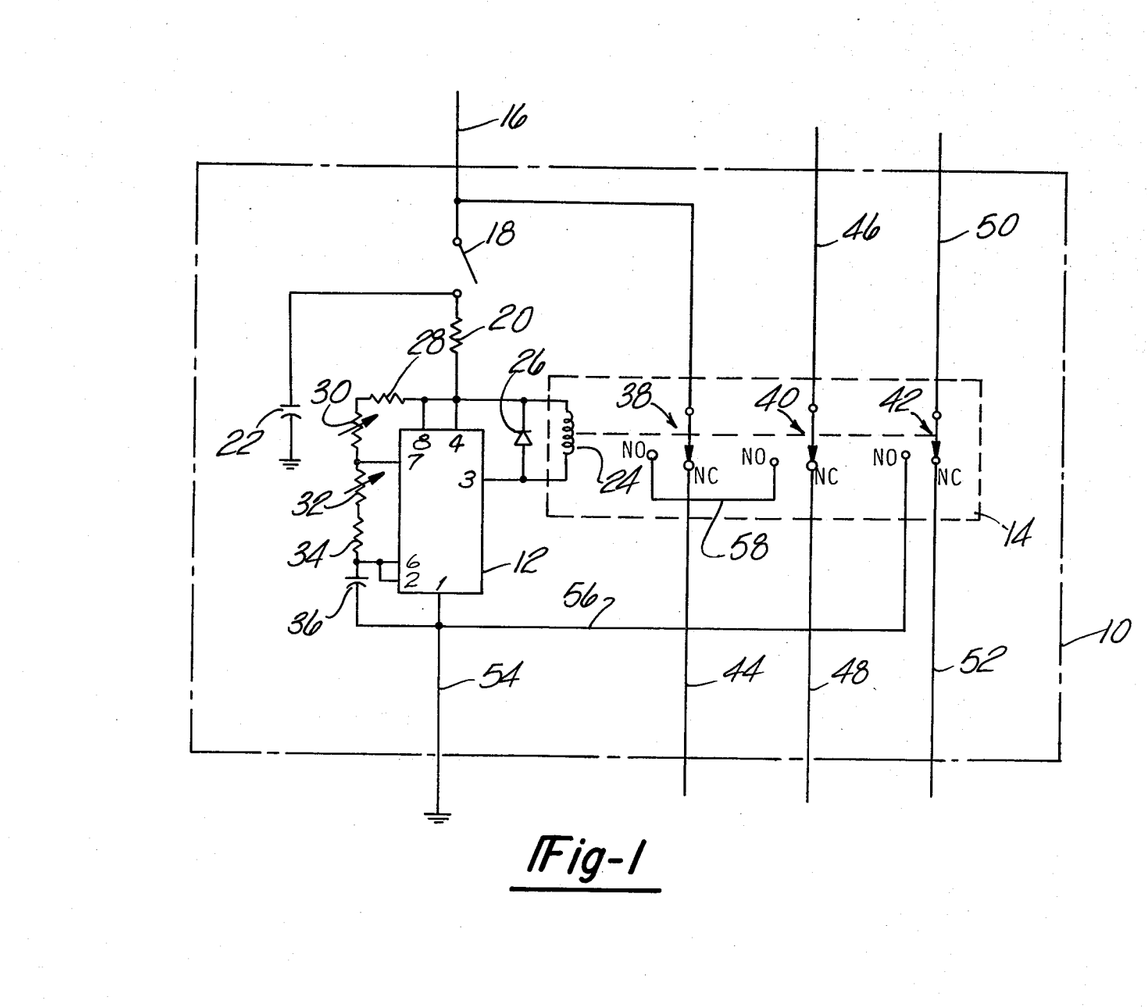
FIG. 1 is a diagram of the disclosed intermittent windshield wiper circuit.

FIG. 1 shows the details of the disclosed intermittent windshield wiper circuit 10 independent of external connections to the windshield wiper mechanism of a vehicle. In kit form, the circuit shown on FIG. 1 would be enclosed in a suitable housing adapted to be mounted to the dash board of a specific vehicle or any other place in the vehicle readily accessible to the vehicle's operator. The following description of the invention is an example of a specific kit which could be supplied. It is not intended to be limiting, in that, as set forth hereafter, the invention disclosed is applicable in a variety of kit forms for specific applications.

For illustration purposes, a typical intermittent windshield wiper kit circuit comprises an integrated timer circuit 12, such as the integrated timer circuit model LN 555 CN manufactured by National Semiconductor, Inc. and a three pole double throw relay switch 14 such as relay switch model number R10-E2-X3-V185 manufactured by Potter Brunfield. The integrated circuit 12 comprises a comparator and an amplifier which produces a signal indicative of a ground potential at output terminals 3 and 7 when the potential at terminal 6 exceeds two thirds ($\frac{2}{3}$) the potential applied to terminal 8. The integrated timer circuit 12 receives electrical power at terminals 4 and 8 from the vehicle's source of electrical power via a red lead 16, serially connected ON-OFF switch 18 and a resistance 20. The vehicle's source of electrical power may be the vehicle's battery or an engine driven source of electrical power such as an alternator or generator as is known in the art. One end of a filter capacitance 22 is connected to the junction between switch 18 and resistance 20 while the other end is connected to a common vehicle ground. The coil 24 of relay 14 is connected between terminals 3 and 4 of the integrated circuit 12. A diode 26 is connected in parallel with the coil 24 to short circuit the inductive kick-back potential generated across terminals 3 and 4 when coil 24 is de-energized. A 0.1 meg ohm resistance 28 and a 2.0 meg ohm variable resistance 30 are serially connected between terminals 7 and 8 of the integrated timer circuit 12. In a like manner, a 47 kohm variable resistance 32 and a fixed 27 kohm resistance 34 are serially connected between terminals 6 and 7 of the integrated timer circuit 12. A 22 microfarad capacitance 36 is connected between terminals 1 and 6 of the integrated timer circuit. Terminal 2 of the integrated timer circuit is connected directly to terminal 6 and terminal 1 is connected to the vehicle's common ground via black lead 54.

The three (3) switches of relay 14 are designated switches 38, 40 and 42. Input lead 16 connected to the pole of switch 18 receives electrical power directly from the vehicle's source of electrical power. The normally closed (NC) contact of switch 38 is connected to an orange lead 44 while the normally open (NO) contact of switch 38 is connected directly to the normally open (NO) contact of switch 40 by means of lead 58. A yellow lead 46 is connected to the pole of switch 40, and a brown lead 48 is connected to the normally closed (NC) contact. A gray lead 50 is connected to the pole of switch 42 and a blue lead 52 is connected to the normally closed (NC) contact of switch 42. The normally open (NO) contact of switch 42 is connected by means of lead 56 to terminal 1 of the integrated timer circuit 12 and to the common ground via black lead 54.

The leads 16, 44, 46, 48, 50, 52, and 54 are color coded as indicated for identification purposes in a practical implementation of the invention and are the external leads used to interconnect the circuit 10 with the electrical circuit of the vehicle's windshield wiper mechanism and source of electrical power. Obviously, other colors may be selected for these external leads, or the leads may be individually labled for identification purposes without departing from the spirit of the invention. Whatever identification means are chosen, the means chosen are keyed exactly to the mounting instructions.

The operation of the circuit shown on FIG. 1 is as follows:

Closing ON-OFF switch 18 energizes the integrated timer circuit 12, and initiates the charging of capacitance 36 through serially connected resistances 28 and 34 and variable resistances 30 and 32. The potential generated across capacitance 36 is applied directly across terminals 1 and 6 of integrated circuit 12. When the potential across capacitance 36 reaches two thirds ($\frac{2}{3}$) of the line voltage applied to terminals 4 and 8 of the integrated timer circuit 12, the integrated timer circuit generates a ground potential or signal at terminals 3 and 7. The ground potential at terminal 3; grounds the output end of the relay coil 24 activating relay 14. The ground potential at terminal 7 causes capacitance 36 to discharge through variable resistance 32 and fixed resistance 34. The rate at which capacitance 36 charges is primarily controlled by the value of series connected fixed resistance 28 and variable resistance 30 while the discharge rate is controlled by the value of serially connected fixed resistance 34 variable resistance 32. The rate at which capacitance 36 charges can, therefore, be varied by adjusting variable resistance 30 and the rate at which capacitance 36 discharges can be controlled by adjusting variable resistance 32.

The activation of relay 14 by grounding the output end of coil 24 via integrated circuit 12 switches the three mechanically interconnected poles of relays 38, 40, and 42 from their normally closed (NC) contacts to their normally open (NO) contacts. With relay 14 de-energized and the poles of switches closed to their normally closed (NC) contacts, electrical power from the venicle's source of electrical power is applied to orange lead 44, yellow lead 46 is connected directly to brown lead 48 and grey lead 50 is connected directly to blue lead 52. When relay 14 is actuated by energizing coil 24, the poles of relay 38, 40, and 42 are closed to their respective normally open (NO) contacts. Electrical power from the vehicle's source is then applied to yellow lead 46 via lead 58 interconnecting the normally open contacts of switches 38 and 40, and the grey lead 50 is placed at ground potential via lead 56. Orange lead 44, brown lead 48 and blue lead 52 connected to the normally closed (NC) contacts of their respective switches are effectively open circuits. As previously indicated, the time that relay 14 is deactivated can be adjusted by adjusting the value of variable resistance 30 and the time that relay 14 is activated can be adjusted by adjusting the value of variable resistance 32. Manual adjustment of variable resistances 30 may be provided by means of a knob external to the housing enclosing the circuit shown on FIG. 1 and may be part of a combined ON-OFF switch-variable resistance element, such as Centralab Potentiometer Control Model JCS-205 which combines in a single package the switch 18 and variable resistance 30.

Figure 2:
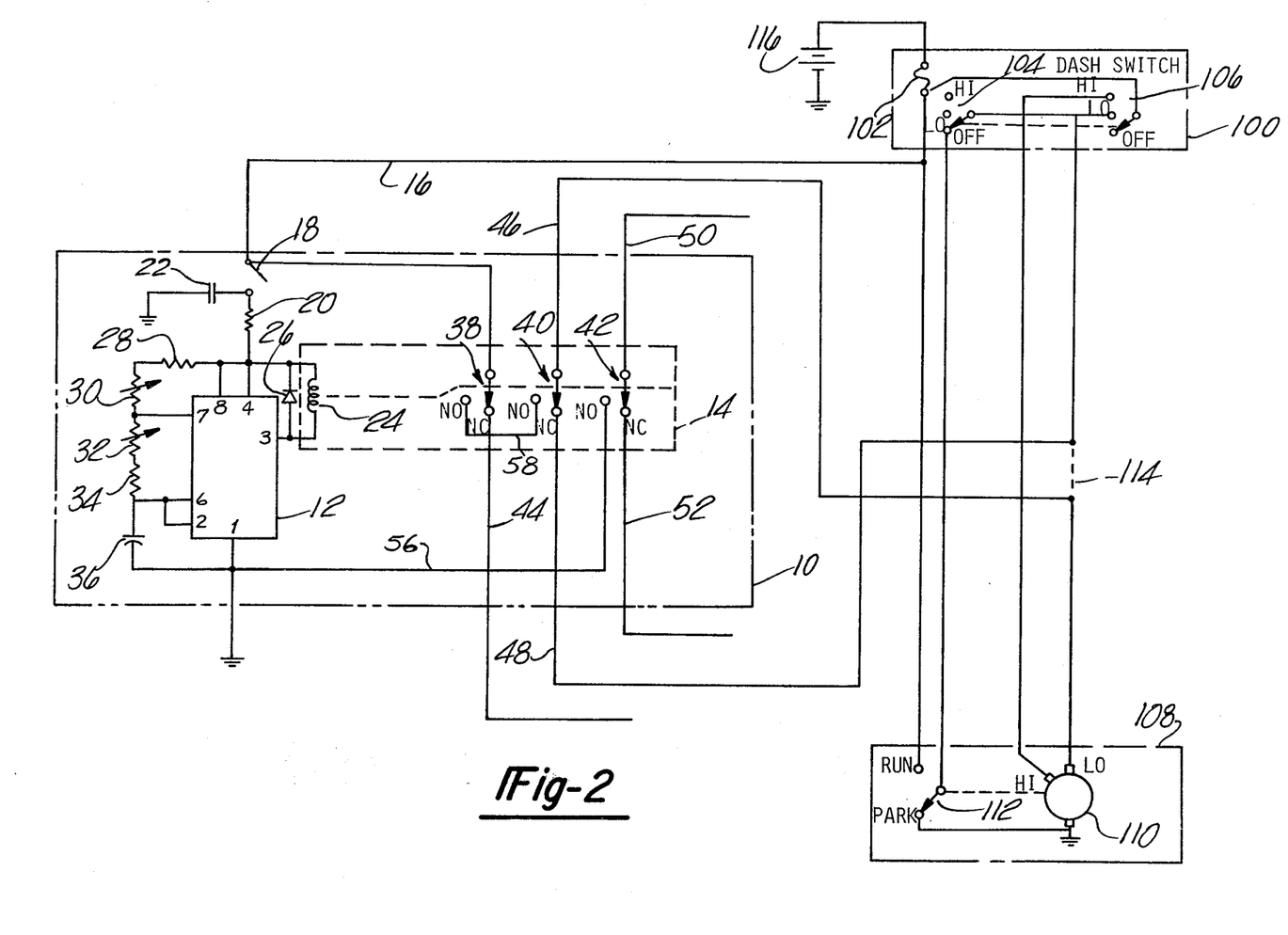
FIG. 2 is a diagram of the disclosed intermittent windshield wiper circuit connected to the electrical circuit of a Ford Motor Company exposed windshield wiper mechanism.

FIG. 2 shows the details of the intermittent windshield wiper circuit 10, connected to the electrical circuit of an exposed wiper mechanism of the type used on automotive vehicle produced by the Ford Motor Company. The integrated timer circuit 12 of the intermittent windshield wiper circuit 10 receives electrical power at terminals 4 and 8 from the vehicles source of electrical power, illustrated as battery 116, through the wiper mechanism's dash switch 100, via the red input lead 16, serially connected ON-OFF switch 18, and a resistance 20.

The electrical circuit of the wiper mechanism comprises the dash switch 100 having a fuse 102 and a two three position switches 104 and 106 ganged together as indicated. The motor assembly 108 includes a wiper motor 110 having a high speed (HI) terminal, a low speed (LO) terminal, a ground terminal and a Run-Park switch 112 of conventional design actuated by the rotation of the motor's output shaft.

The fuse 102 receives electrical power from the vehicle's power supply indicated as battery 116 at one end. As previously indicated, the battery 116 may be supplemented by an engine driven source of electrical power such as a generator or alternator which provides the desired electrical power when the engine is running. The other end of the fuse is connected directly to the Run terminal of the Run-Park switch 112, the pole of three position switch 106 and to the intermittent wiper circuit 10 via red lead 16. The OFF contact of switch 106 is unconnected. The low speed (L0) contact of switch 106 is connected to the pole of switch 104 and to the brown lead 48. The high speed (HI) contact of switch 106 is connected to the HI input terminal of the wiper motor 110. The LO input terminal of the wiper motor 110 is connected to the yellow lead 46. The orange lead 44, gray lead 50, and blue lead 52 are not used in this particular installation and, therefore, are shown open ended.

The HI and LO contacts of switch 104 are open while the OFF contact is connected to the pole of the "Run-Park" switch 112.

The operation of the wiper mechanism shown on FIG. 2 without the intermittent wiper circuit will be discussed first. In the unactuated state of the wiper mechanism, the Dash Switch 100 is in the "OFF" position and the pole of the Run-Park Switch is closed in the Park position. The Run-Park Switch 112 is configured so that the pole is closed to the "Run" contact during all but a small angular segment of revolution of the wiper motor's output shaft. In the small angular segment, the pole of the RunPark Switch 112 is closed to the "Park" contact.

When the dash switch 102 is placed in the LO position, electrical power is supplied to the LO input terminal of the wiper motor 110 through switch 106 and the normally closed contact of switch 40 in the intermittent wiper circuit. With the application of electrical power to the LO input terminal of the wiper motor 110, its output shaft begins to rotate and the pole of the Run-Park Switch 112 switches to the "Run" contact. Without the intermittent wiper system 10, the LO contact of switch 106 is connected directly to the LO input terminal of the wiper motor 110 as indicated by dashed line 114.

In a like manner, when the Dash Switch 102 is placed in the HI position, electrical power is supplied to HI input terminal of the wiper motor 110 through switch 106. The wiper motor will run continuously at the selected high or low speed as long as the Dash Switch 110 remains in either the HI or LO position.

Placing the Dash Switch 100 in the OFF position as shown in FIG. 1 terminates the electrical power to the wiper motor 110 through switch 106.

If the position of the wiper motor's output shaft is in any position other than the small angular segment during which the pole of the Run-Park switch 112 is closed in the "Park" position, electrical power will be supplied to the LO input terminal of the wiper motor through the "Run-Park" switch 112, switch 104, and switch 40 of relay 14. Electrical power will continue to be supplied to the wiper motor 110 until its output shaft has rotated to the angular segment where the pole of switch 112 switches from the "Run" position to the "Park" position. The switching of the Run-Park Switch 112 to the "Park" position terminates electrical power to the motor and it stops. The position at which the motor stops is called the "Park" position. At this position, the windshield wiper blade driven by the motor 110 is at one end or the other of its back and forth motion so that the wiper blade is parked (stopped) outside the vehicle operator's primary field of vision.

The operation of the intermittent wiper circuit 10 in combination with the vehicle's wiper mechanism will now be discussed. The Dash Switch 102 is assumed to be in the Off position as illustrated. Closing On-Off switch 18 energizes the integrated timer circuit 12 and initiates the charging of capacitance 36 through serially connected resistance 28 and 34 and variable resistances 30 and 32. The potential across capacitance 36 is applied directly to terminal 6 of the integrated circuit 12. When the potential on the capacitance 36 reaches two thirds ($\frac{2}{3}$) of the line voltage at terminals 4 and 8 of the integrated circuit 12, the integrated circuit 12 produces a ground signal at terminals 3 and 7. The ground signal at terminal 3 grounds the output end of the relay coil 24 activating relay 14. The ground signal at terminal 7 initiates the discharge of capacitance 36 through variable resistance 32 and resistance 34.

The activating of the relay 14 by grounding the output terminal of relay coil 24 actuates relay switches 38, 40 and 42 closing their poles to their normally open (NO) contacts. Electrical power is now supplied to the LO input terminal of wiper motor from the red power input lead 16 through relay switches 38 and 40 as long as the output terminal of relay coil 24 remains at a ground potential. The application of electrical power to the LO input terminal energizes the wiper motor causing the output shaft to rotate and switch the pole of Run-Park switch from the Park to the Run position. The value of variable resistance 32 is adjusted so that the relay 14 remains energized for a period of time sufficient to assure the wiper motor's output shaft rotates far enough to close the RunPark Switch 112 to the Run position. The time that relay 14 is activated is adjusted by means of variable resistance 32 to be longer than 0.8 seconds assuring the closing of the Run-Park switch to the Run position and shorter than the time required for the wiper motor 110 to make a complete revolution.

The closing of the Run-Park switch 112 to the Run position places electrical power at the normally closed (NC) contact of relay switch 40. Therefore, when the relay 14 is deactivated returning the poles of relay switch 38, 40 and 42 to the normally closed (NC) contacts, the power received from the red input power lead 16 through relay switch 38 is terminated. However, electrical power is now supplied to the wiper motor 110 through the RunPark switch 112 and the normally closed contact of relay switch 40 and from the pole of relay switch 40 to the LO input terminal of motor 110 via yellow lead 46. With the relay 14 in the deactivated state, the motor will continue to receive electrical power until its output shaft reaches the "Park" position at which time the Run-Park Switch 112 switches back to the Park position. The switching of Run-Park Switch 112 to the Park position terminates electrical power to the wiper motor 110 and it stops as previously described. The wiper motor remains in the park position until capacitance 36 again recharges to $\frac{2}{3}$ of the line voltage and relay 14 is again activated initiating a new cycle. The operation of the circuit continues as long as ON-OFF switch 18 is closed and power is supplied to the intermittent windshield wiper circuit 10.

Adjustment of variable resistance 30 permits the dwell time between the activation of the relay 14 to be varied from between approximately 3 seconds to more than 40 seconds. Manual adjustment of variable resistance 30 may be provided by means of an external knob provided on the control panel of the intermittent wiper circuit as previously indicated.

The operation of the intermittent wiper circuit is transparent to the vehicles wiper circuit when the Dash Switch is placed in either the HI or LO positions as shall be explained below. Assume the Intermittent Wiper Circuit 10 is energized by closing switch 18 and the relay 14 is periodically actuated as explained above. Placing the Dash Switch 100 in the LO position applies electrical power to the normally closed (NC) contact of switch 40 via the brown lead 48. When the Relay Switch 14 is in the unactuated state, electrical power is supplied to the LO input terminal of Wiper Motor 110 through switch 40 and yellow lead 46. When the Relay Switch 14 is actuated by a ground potential appearing at terminal 3 of the integrated circuit 12, the poles of switches 38 and 40 switch to their normally open contacts and electrical power is supplied to the wiper motor 110 through the red power lead 16, switches 38 and 40 and yellow lead 46. Therefore, electrical power is supplied to motor 110 independent of the state of relay switch 14.

When the Dash Switch 100 is placed in the HI position electrical power is supplied directly to the HI input terminal of the motor 110 through ganged switch 106. It is noted that electrical power will also be momentarily supplied to the LO input terminal of motor 110 through the closing of switches 38 and 40 to their normally open (NO) positions each time the relay 14 is actuated by the timer circuit. However, this application of electrical power to the LO terminal does not affect the operation of the motor 110 receiving power at its HI terminal and the motor will continue to run.

Figure 3:
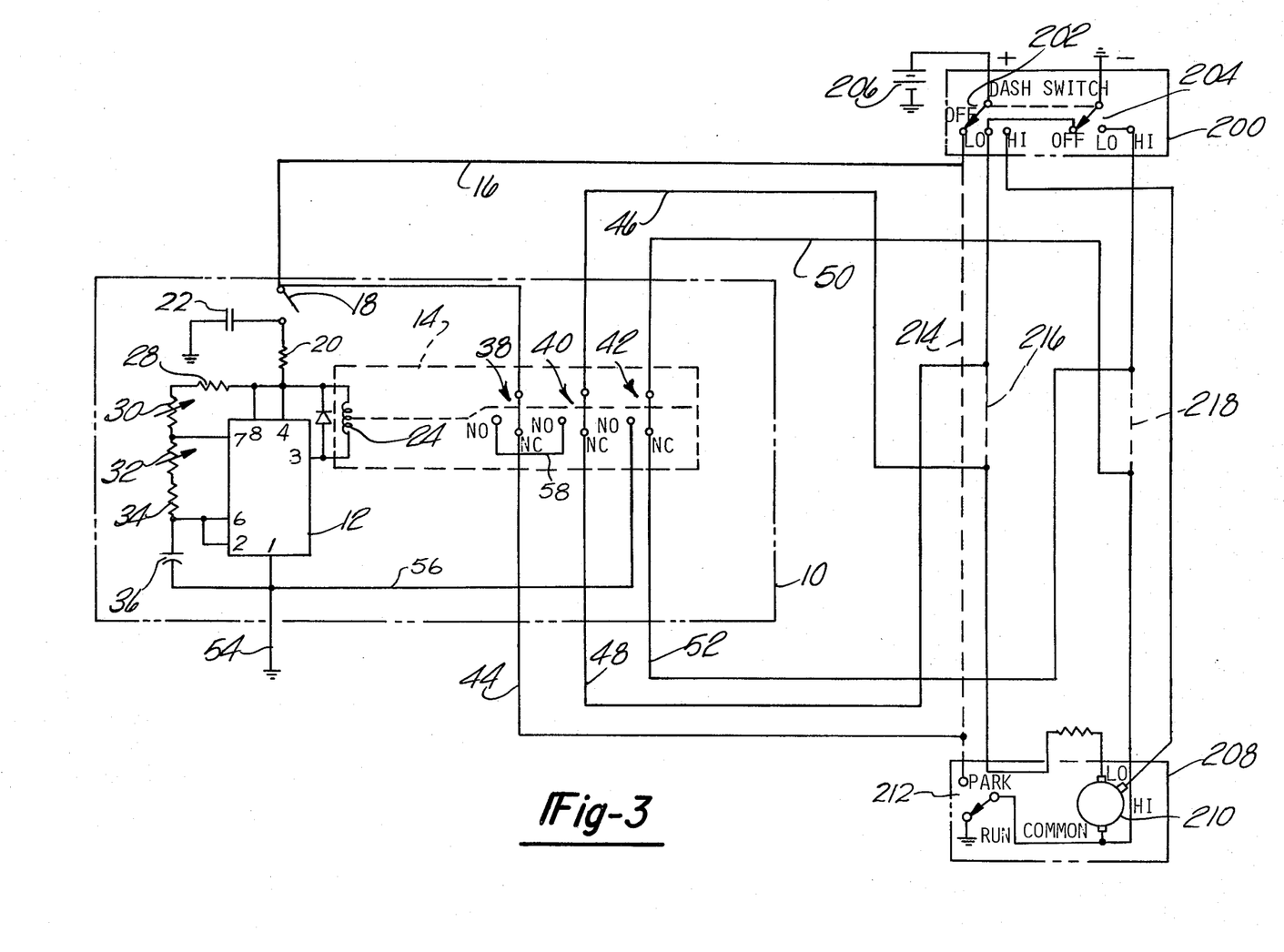
FIG. 3 is a diagram of the disclosed intermittent windshield wiper circuit connected to the electrical circuit of a Chrysler Corporation concealed windshield wiper mechanism.

Referring now to FIG. 3, there is shown the disclosed intermittent windshield wiper system connected to a concealed wiper circuit of the type installed on vehicles produced by the Chrysler Corporation. In a concealed wiper circuit when the Dash Switch is turned to the OFF position, the current through the motor 210 is reversed causing the motor's output shaft to turn in the opposite direction. Turning of the motor's output shaft in the opposite direction engages a drive train which lowers the wiper blade into a recess. In this type of wiper circuit, the actuation of the Run-Park Switch 212 illustrated in FIG. 3 is different from the Run-Park Switch 112 shown on FIG. 2. The Run-Park Switch 212 of FIG. 3 is normally in the Run position when the wiper blade is parked in the recess. When the motor 210 is energized, the Run-Park Switch 212 quickly switches to the Park position and remains in the Park position as long as the motor 210 runs in a forward direction. Reversing the direction of the motor 210 engages the Run-Park switch 212 and switches it back to the Run position when the position of the output shaft is such that the wiper blade is parked in the recess. The details of the Run-Park Switch 212 and the linkages between the motor 210 and the wiper blade are not material to the operation of the disclosed intermittent circuit and, therefore, need not be discussed. Service manuals which contain a complete description of the various types of concealed windshield wiper systems and their theory of operation are readily available to the general public from vehicle manufacturers. Returning once again to FIG. 3, the intermittent wiper circuit 10 is identical to that shown in FIG. 1, therefore, the indentifying indicia are the same. The Dash Switch 200 has a pair of ganged three position switches 202 and 204 comparable to switches 104 and 106 of FIG. 2. The pole of switch 202 is connected to receive electrical power from the positive terminal of the vehicles power supply 206. The wiper motor assembly 208 comprises the wiper motor 210 and the Run-Park Switch 212 described above.

Returning to Dash Switch 200, the Off contact of switch 202 is connected to the red lead 16 of the intermittent wiper circuit 10. The LO contact is connected to the brown lead 48 and the HI contact is connected to the HI input terminal of wiper motor 210.

The pole of switch 204 is connected to a common ground. The Off contact is connected to the LO contact of switch 202, while the LO contact and HI contact of switch 204 are connected together and to the blue lead 52 of the intermittent wiper circuit 10. The orange lead 44, yellow lead 46 and gray lead 50 of the intermittent wiper circuit 10 are individually connected to the Park contact of the Park-Run switch 212, to the LO input terminal of the motor 210 and to the Common terminal of the motor 210 as shown. The Run contact of the Run-Park Switch 212 is connected to ground and the pole of Run-Park Switch 212 is connected to the Common terminal of motor 210.

The operation of the concealed wiper circuit prior to the connection of the intermittent wiper circuit 10 thereto is as follows:

For discussion purposes, the Off contact of switch 202 is connected directly to the Park contact of Run-Park Switch 212 as indicated by dashed line 214, the LO contact of Switch 202 is connected directly to the LO terminal of the wiper motor 210 as indicated by dashed line 216 and the HI contact of switch 204 is connected directly to the common terminal of Wiper Motor 210 as indicated by dashed line 218. At this point, it should be noted that the switches 38, 40 and 42 in their normally closed (NC) positions complete the interconnection indicated by the dashed lines 214, 216 and 218 respectively.

Assuming the Dash Switch 200 is in the Off position, and the Run-Park switch 212 is in the Run position with the wiper blade parked in the recess turning the Dash Switch to either the HI or LO positions applies electrical power to the Wiper Motor 210 through switch 202. The common terminal of Wiper Motor 210 is grounded through switch 204. With the application of electrical power, the output shaft of the Wiper Motor 210 starts to rotate switching the Run-Park Switch 212 to the Park position and drives the wiper blade from its recess position. As long as the Dash Switch 200 remains in either the HI or LO positions, the Wiper Motor 210 will continue to run and the wiper blade will be driven back and forth across the windshield in the conventional manner.

Placing the Dash Switch 200 in the "Off" position causes switch 204 to ground the LO terminal of the Wiper Motor 210 while simultaneously removing the ground applied to the Common Terminal. Electrical power is now applied to the Common Terminal of the wiper motor 210 through switch 202 and the Run-Park Switch 212 which is in the Park position. With this arrangement, the current through the motor is reversed and the output shaft rotates in the opposite direction. Rotating the output shaft of the motor in this opposite direction, engages the park linkage of the wiper blade and the wiper blade is driven towards the recess position. When the motor's output shaft reaches the position where the wiper blade is placed in recess, the Run-Park Switch 212 is switched back to the Run position, terminating the application of electrical power to the motor's Common Terminal, completing the operational cycle.

The operation of the Intermittent Wiper Circuit 10 connected to the concealed wiper circuit shown on FIG. 3 is as follows. It is first assumed the Dash Switch 200 is in the Off position grounding the LO input terminal to the Wiper Motor 210 through the pole and normally closed (NC) contact of relay switch 40 in the Intermittent Wiper Circuit 10. Likewise, electrical power is applied to the Park contact of the Run-Park Switch 212 from the Off contact of switch 202 through the pole and normally closed contact of relay switch 38 and its connecting circuitry. The Common Terminal of the Wiper Motor 210 is connected to the pole of relay switch 42 through gray lead 50.

Closing ON-OFF switch 18 energizes the timer circuit consisting of integrated circuit 12 capacitor 36, resistances 28 and 34 and variable resistances 30 and 32 which causes the terminal 3 of the integrated circuit 12 to assume a ground potential actuating relay 14 as previously discussed. When relay 14 is actuated, the poles of relay switches 38, 40 and 42 close to their normally open (NO) contacts. With the relay 14 actuated, electrical power is applied to the normally open (NO) contact of relay switch 40 through relay switch 38 and to the LO input terminal of the motor from the pole of relay switch 40 through yellow lead 46. The Common Terminal of the wiper motor 210 is grounded through the Run-Park Switch 212 in the Run position and through relay switch 42 via gray lead 50, lead 56, and black lead 54. The motor is energized and output shaft starts to rotate in a forward direction which switches the Run-Park Switch 212 to the Park position. However, the Common Terminal of the wiper motor 210 remains grounded through gray lead 50 relay switch 42 and leads 54 and 56. The variable resistance 32 is adjusted so that the relay 14 is energized for a period of time sufficient for the wiper blade to make a full back and forth motion (one cycle). At the end of the cycle, the timer circuit is deenergized and the poles of relay switches 38, 40 and 42 returns to their normally closed (NC) contacts. With the poles of relay switches 38, 40 and 42 closed to their normally closed (NC) contacts, electrical power is applied to the Common Terminal of the Wiper Motor 210 through the Run-Park Switch which was switched to the Park position, through the normally closed (NC) contact and pole of relay switch 38, through red lead 16 to the Off contact of switch 202. The LO terminal of the motor is grounded through the pole and normally closed (NC) contact of relay switch 40, through the LO contact of switch 202 and the Off contact and pole of switch 204. With the power applied to the Common terminal of wiper motor 210 and the LO terminal grounded, the output shaft rotates in the reverse direction until the wiper blade is placed back in its recess and the Run-Park Switch is switched to its Run position. This cycle repeats itself each time the coil 24 in relay 14 is energized by the timer circuit. The adjustment of variable resistance 30 determines the dwell time between wiping cycles.

If at any time, the Dash Switch 200 is switched to either the HI or LO positions with the On-Off switch 18 in the Intermittent Wiper Circuit 10 closed, power received via the red lead 16 from the Off contact of switch 202 is terminated, and the Intermittent Wiper Circuit 10 is disabled with the relay switches 38, 40 and 42 in their normally closed (NC) positions. As previously stated, relay switches 38, 40, and 42 in their normally closed positions effectively complete the circuits indicated by dashed lines 214, 216 and 218, therefore, the concealed wiper circuit will function the same as if the Intermittent Wiper Circuit was not connected to the circuit of the windshield wiper mechanism.

Figure 4:
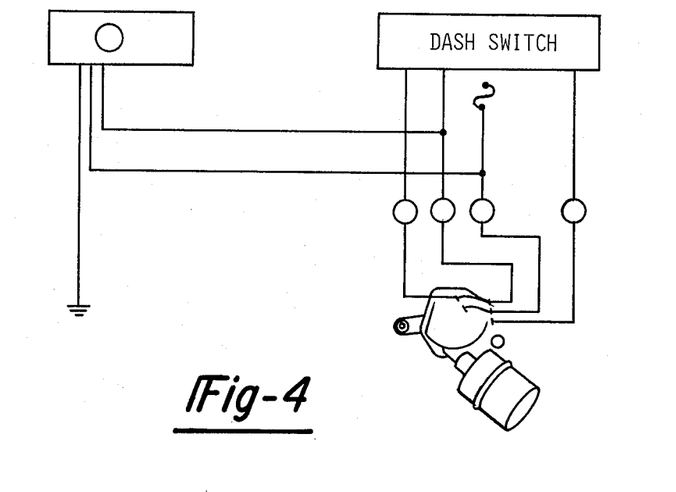
FIG. 4 is a diagram of the connections between the disclosed intermittent windshield wiper circuit and a General Motor Corporation concealed windshield wiper mechanism.
Figure 5:
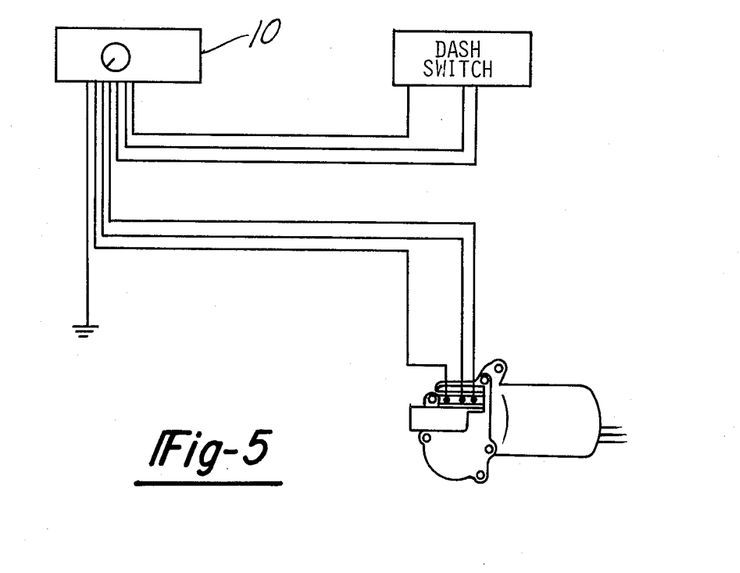
FIG. 5 is a diagram of the connections between the disclosed intermittent windshield wiper circuit and a Ford Motor Company concealed windshield wiper mechanism.

FIGS. 4 and 5 show the connections of the Intermittent Wiper Circuit 10 to concealed wiper circuits used in automotive vehicles produced by the General Motors Corporation and the Ford Motor Company as further examples of the adaptability of the disclosed intermittent wiper circuit to almost every type of windshield wiper mechanism incorporated on current production automotive vehicles. In addition to those shown and illustrated, the Intermittent Wiper Circuit 10 disclosed herein has been successfully installed in combination with exposed and concealed wipers of most automotive vehicles produced in the United States as well as several automotive vehicles produced overseas through appropriate connection of the color coded leads. No internal modification of the intermittent windshield wiper circuit is required other than the manual adjustment of variable resistance 30 for particular application such as the Chrysler Corporation concealed wiper mechanism discussed above.

A detailed description of the connections and operation of the intermittent wiper system in combination with other types of windshield wiper mechanisms shown on FIGS. 4 and 5 would be redundant in view of the two examples illustrated and discussed in detail above. It is intended that detailed wiring diagrams, such as shown in FIGS. 4 and 5 would be supplied with each intermittent wiper circuit to facilitate installation. This will permit any qualified service station mechanic or the owner himself to install and connect the intermittent wiper circuit to the windshield wiper mechanism of his or her automotive vehicle.

The advantages and novelty of the disclosed intermittent wiper system are as follows:

(1) The intermittent wiper circuit can be installed on a wide variety of automotive vehicles having different types of windshield wiper mechanisms without modification or changes to its own internal circuit.

(2) The installation is simple and can be performed by a knowledgable service station mechanic or by the owner himself using commonly available tools.

(3) The disclosed intermittent wiper circuit is transparent to the vehicles windshield wiper circuit, therefore, no special operating procedures are required.

(4) The disclosed intermittent wiper circuit is completely overridden by the actuation of the vehicles' standard windshield wiper control switch.

(5) The cost of the disclosed intermittent wiper circuit is substantially below the cost of comparable systems installed by the vehicle manufacture or its dealer placing the intermittent wiper system within an acceptable cost range for a majority of vehicle owners.

What is claimed is:

1. An intermittent windshield wiper circuit connectable to the windshield wiper mechanism of a vehicle to provide an intermittent mode of operation comprising:
    timer means, operative to be energized by the vehicles' source of electrical power for generating pulse signals at predetermined intervals; and
    switch means actuated by said pulse signal for switching signals between at least a first, a second, a third, a fourth, and a fifth lead, said switch means having a first state in the absence of said pulse signals and switchable to a second state in response to said pulse signals, said switch means in said first state operative to connect the vehicle's source of electrical power to said first lead, to connect said second lead to said third lead, and to connect said fourth lead to said fifth lead, and in said second state operative to connect the vehicle's source of electrical power to said second lead, connect said fourth lead to a common ground potential and wherein said first, third and fifth leads are disconnected from all other leads in said second state.

2. The intermittent wiper circuit of claim 1 wherein said switch means includes:
    a first switch switchable from said first state to said second state in response to said pulse signals, said first switch in said first state applying electrical power from the vehicle's source of electrical power to said first lead and in said second state applying said electrical power to a first terminal;
    a second switch switchable from said first state to said second state in response to said pulse signal, said second switch in said first state connecting said second and third leads and in said second state connecting said second lead to a second terminal;
    means for connecting the second terminal of said first switch with the second terminal of said second switch; and
    a third switch switchable from said first state to said second state in response to said pulse signal, said third switch in said first state connecting said fourth lead to said fifth lead and in said second state connecting said fourth lead to a terminal connected to a common ground.

3. The intermittent windshield wiper circuit of claim 1 wherein said switch means is a three pole double throw relay switch having a solenoid coil energized in response to said pulse signals and operative to switch each of said poles from an associated normally closed contact to an associated normally open contact in response to energizing said coil, the first of said poles is connected to the vehicle's source of electrical power, the associated normally closed contact is connected to said first lead, the second pole is connected to the second lead, the associated normally closed contact is connected to said third lead, and the associated normally open contact is connected to the normally open contact associated with said first poles, the third pole is connected to said fourth lead, the associated normally closed contact is connected to said fifth lead and the associated normally open contact is connected to a common ground.

4. The intermittent windshield wiper circuit of claims 1 or 3 wherein said timer means includes means for adjusting the dwell time between said pulse signals.

5. The intermittent windshield wiper circuit of claim 4 further including means for adjusting the time duration of said pulse signals.

6. The intermittent windshield wiper circuit of claim 1 or 3 wherein said timer means further includes means for adjusting the dwell time between said pulse signals and the time duration of said pulse signals.

7. The intermittent windshield wiper circuit of claim 1 wherein said timer means further includes an On-Off switch controlling the energizing of said timer means from the vehicles' source of electrical power.

8. The intermittent windshield wiper circuit of claim 1 wherein said timer means comprises:
    a capacitor;
    a resistance connected between the source of electrical power and said capacitor to control the rate at which said capacitor is charged;
    a comparator responsive to the charge on said capacitor for generating a signal when the charge on said capacitor exceeds a predetermined potential; and
    circuit means responsive to the signal generated by said comparator for generating said pulse signals and for generating a discharge signal discharging said capacitor.

9. The intermittent wiper circuit of claim 8 wherein said resistance includes at least a first variable resistance in series with said capacitor and said predetermined rate at which said capacitor is charged is a variable rate determined by the value of said first variable resistance and controls the dwell time between said pulse signals.

10. The intermittent wiper circuit of claim 9 wherein said resistance further includes a second variable resistance disposed in series with and in between said first variable resistance and said capacitor;
    and wherein said circuit means generates said discharge signal having a ground potential applied to the junction between said first and second variable resistances, said second variable resistance controlling the discharge rate of said capacitor and the time duration of said pulse signals.

11. The intermittent wiper circuit of claim 8 or 10 wherein said comparator and circuit means is a commercially available integrated circuit.

12. The intermittent wiper circuit of claim 8 or 10 wherein the solenoid coil has one end connected to the source of electrical power, the pulse generated by said circuit means is a ground potential applied to the other end of said solenoid coil.

* * * * *

UNITED STATES PATENT AND TRADEMARK OFFICE
CERTIFICATE OF CORRECTION

PATENT NO. : 4,286,200
DATED : August 25, 1981
INVENTOR(S) : Ralph V. Brown

It is certified that error appears in the above—identified patent and that said Letters Patent is hereby corrected as shown below:

Column 1, line 12, after "2", insert a period.

Column 5, line 53, delete the numeral "102" and insert ----100----.

Column 5, line 65, delete the numeral "102" and insert ----100----.

Column 6, line 1, delete the numeral "110" and insert ----100----.

Signed and Sealed this

Eighth Day of December 1981

[SEAL]

Attest:

GERALD J. MOSSINGHOFF

*Attesting Officer*       *Commissioner of Patents and Trademarks*